Aug. 6, 1929.  W. F. KELLER  1,723,788
AUTOMOBILE HEADLIGHT
Filed June 2, 1928   2 Sheets-Sheet 1
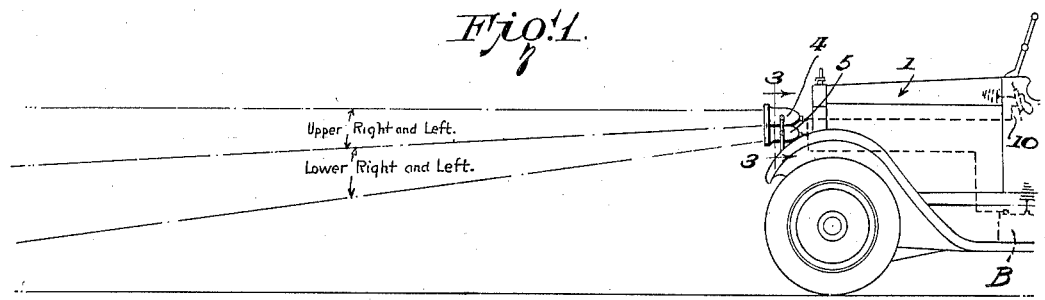
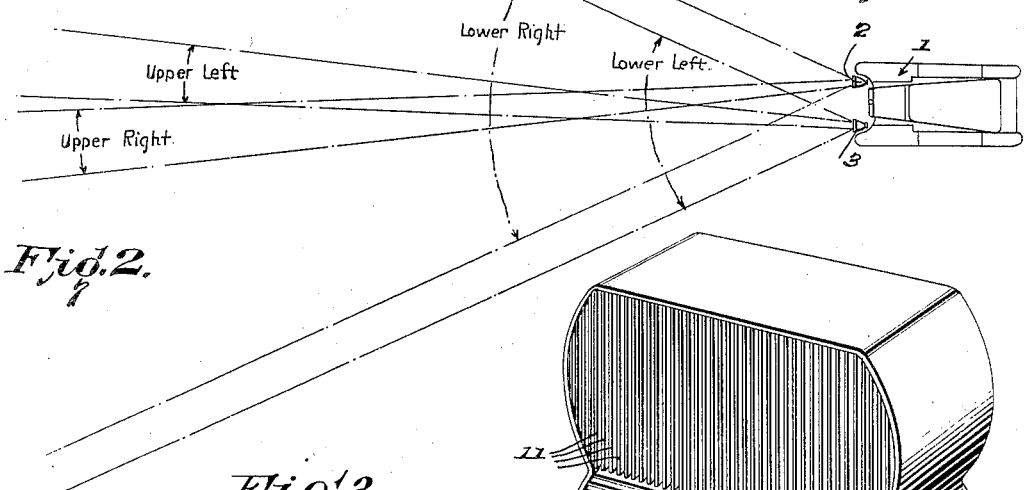
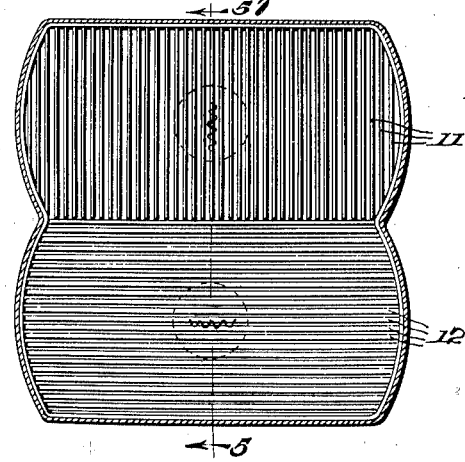
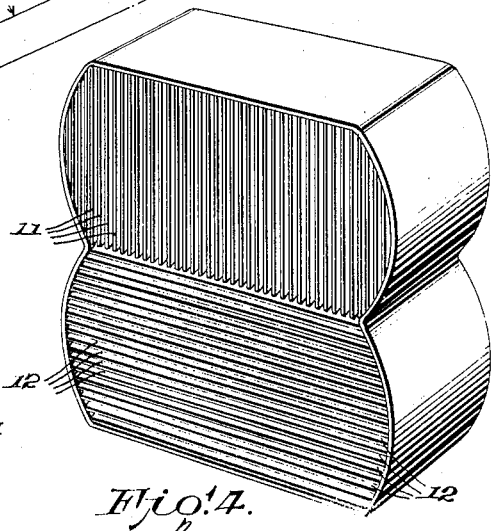
Inventor
William F. Keller,
By Smith and Michael,
Attorneys

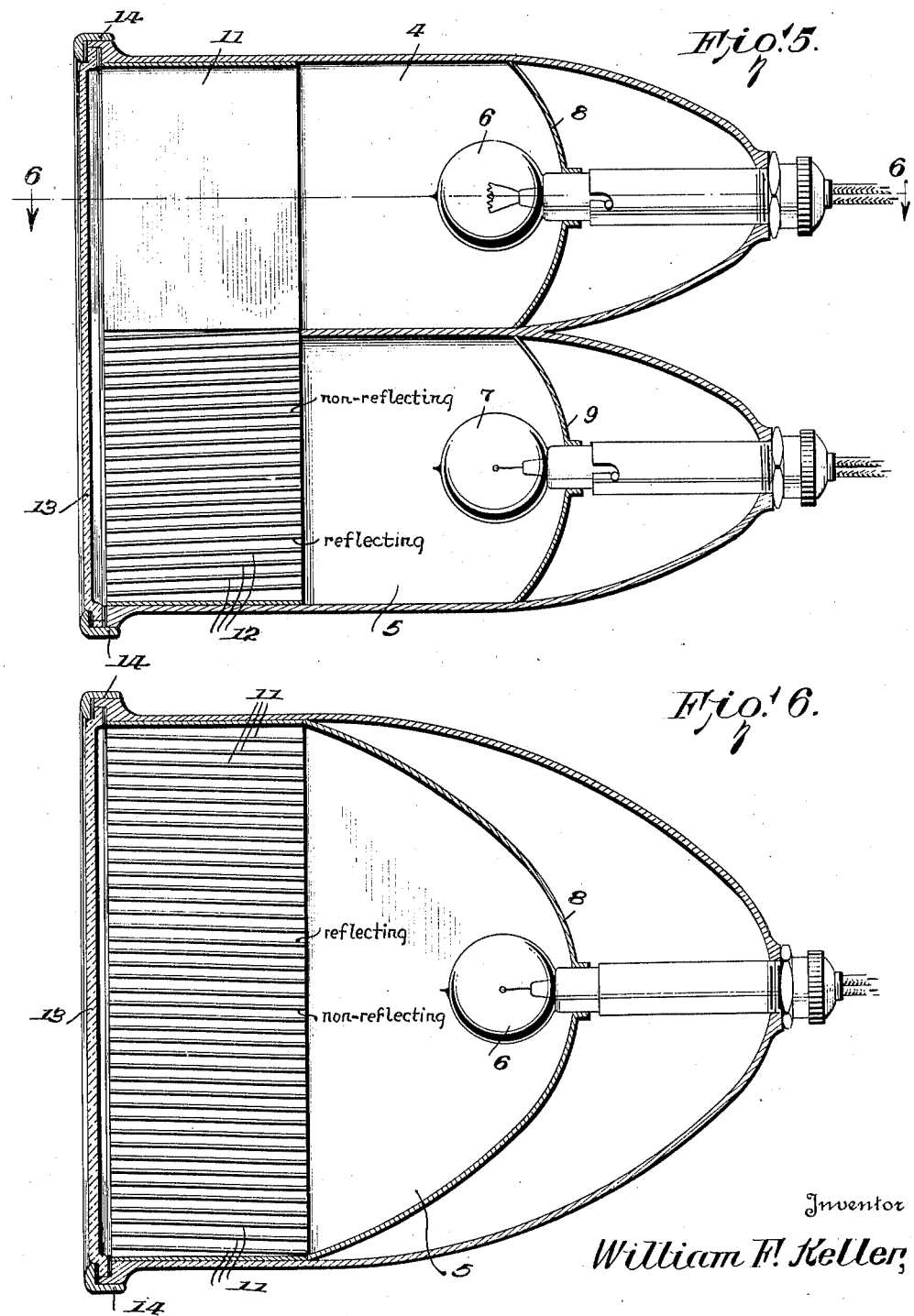

Patented Aug. 6, 1929.

1,723,788

UNITED STATES PATENT OFFICE.

WILLIAM F. KELLER, OF DECATUR, ILLINOIS.

AUTOMOBILE HEADLIGHT.

Application filed June 2, 1928. Serial No. 282,408.

My invention relates to vehicle headlights and has particular reference to headlights for automobiles and other road vehicles.

An object of my invention is to provide a construction and arrangement of headlights for effecting a proper distribution of light to illuminate the roadway in advance of the vehicle, and to include in such construction and arrangement, means whereby a portion of the total illumination may be cut out to avoid the existence of the objectionable "glare" or blinding effect upon the eyes of the driver or occupants of an approaching vehicle.

A further object of my invention is to provide a pair of headlights adapted to be mounted at the right and left of the front portion of a vehicle, each headlight of the pair comprising an upper and lower compartment each equipped with a separate reflector and bulb and each including means for directing its respective rays over a predetermined portion of the roadway in advance of the vehicle.

A further object of my invention is to provide a pair of headlights adapted to be mounted at the right and left of the front portion of a vehicle, each headlight of the pair comprising an upper and lower compartment each equipped with a separate reflector and bulb, the lower compartments of each pair having horizontal slats positioned in front of the reflector for directing the light rays downwardly and across a substantially wide area in advance of the vehicle, the upper compartment of the headlight at the left side of the vehicle having vertical slats in front of its reflector for directing its light rays straight ahead and to the right side of the roadway, and the upper compartment of the headlight at the right side of the vehicle having vertical slats in front of its reflector for directing its light rays straight ahead and to the left side of the roadway, means being provided for cutting off the light in the upper compartment of the headlight at the right side of the vehicle to avoid the glare which would otherwise strike the eyes of the driver or occupants of an approaching vehicle.

A still further object of my invention is to provide a device of the above mentioned character which is simple in construction, cheap and easy to manufacture, strong and durable and highly efficient in the purposes for which designed.

In the accompanying drawings forming a part of this specification and in which I have shown a preferred embodiment of my invention, Fig. 1 is a side elevation of the front section of an automobile equipped with my invention, showing the direction of the rays of light projected from the upper and lower compartments of the headlights;

Fig. 2 is a plan view of the same, showing the direction of the rays of light projected from each of the four compartments comprising the pair of headlights;

Fig. 3 is a sectional view on the line 3—3 of Fig. 1, showing the arrangement of the vertical and horizontal slats for the upper and lower compartments respectively;

Fig. 4 is a perspective view of the vertical and horizontal slats shown in Fig. 3;

Fig. 5 is an enlarged vertical sectional view through one of the headlights;

Fig. 6 is a horizontal sectional view on the line 6—6 of Fig. 5, this view being taken through the headlight adapted for mounting on the left side of the vehicle and in which the vertical slats are slightly inclined to the right, it being noted that a disclosure of the right hand headlight would be the same except that the vertical slats would be inclined to the left, and, Fig. 7 is a diagrammatic showing of the control switch and electrical connections between said switch, the vehicle battery and the bulbs within the several compartments.

Referring to the drawings, wherein like reference characters are employed to designate like parts throughout the several views, the numeral 1 designates an automobile or other road vehicle, on which is mounted a pair of headlights 2 and 3 positioned respectively at the right and left sides of the front portion thereof. Each headlight comprises an upper compartment 4 and a lower compartment 5, each provided with separate bulbs 6 and 7, and with separate reflectors 8 and 9 respectively. The bulbs in each of the four compartments are connected and controlled by a suitable switch mechanism 10, mounted on the dash of the vehicle or in a position within easy reach of the driver, whereby the electric current from the vehicle storage battery may be turned "on" or "off" to put on or cut off all the light, and whereby the light in the upper compartment of the headlight at the right side of the vehicle may be turned out, leaving the other three bulbs burning, for a purpose to be hereinafter described.

In the preferred form of my invention, the reflectors 8 and 9 are not of the usual complete parabolic shape or form but are made from parabolic reflectors having a section of their top and bottom portions truncated or cut off so that each reflector is approximately twice as wide as it is high. Instead of using the conventional electric light bulb having a V-shaped filament, I prefer to use a bulb having a straight filament extending transversely to the axis of the bulb, it having been found that when this type of bulb is placed in the upper section 4 of my headlight with the filament extending vertically, the light rays will be projected considerably above and below the headlight but will not be projected very much to the right or left thereof. When this type of bulb with straight filament is placed in the lower section 5 with the filaments extending horizontally, the light rays will be projected considerably to the right and left of the headlight but will not be projected very much above and below thereof, it being understood that in both cases the combination of the straight filament and the truncated form of the reflector effects the described distribution of the light rays.

Within each of the upper and lower compartments 4 and 5 respectively of each headlight 2 and 3, and in advance of the reflectors 8 and 9 therein, I provide a series of parallel plates 11 and 12, preferably of sheet metal, the plates 11 of the upper compartments being arranged in vertical, parallel spaced relation, and the plates 12 of the lower compartments being arranged in horizontal, parallel spaced relation, as clearly shown in Figs. 3 and 4 of the accompanying drawings. The casing containing the two compartments 4 and 5 of each headlight 2 and 3, is closed at its forward end by a transparent lens 13 which extends completely over the front end of the casing and is retained thereon by means of a clamping ring 14, this lens and clamping ring being of any preferred construction and forming no part of my present invention.

Referring particularly to the construction and function of the plates or slats 12 within each of the lower compartments 5 of each headlight, it is to be noted that these plates have a substantial depth, say approximately 3¼ inches, and that they extend across the entire front of the compartment 4 in parallel spaced relation, these plates 12 being inclined downwardly toward the front of the headlight, say at an angle of approximately 1½° to 3° from a horizontal plane through the axis of the casing. Instead of inclining the plates downwardly as described, the plates may be arranged parallel to a horizontal plane through the axis of the casing and the casing itself may be tilted downwardly at an angle of from 1½° to 3°. Or, if desired, the plates may be inclined downwardly at an angle of 1½° to a horizontal plane through the axis of the casing and the casing itself may be tilted downwardly at an angle of 1½°, thus giving the plates a downward inclination of approximately 3°, which inclination has been found best suited to accomplish the objects of my invention. I have found that these plates should be spaced about 3/16 of an inch apart. The upper surface of each of the plates or slats 12 is unpolished or otherwise rendered non-reflecting, whereas the lower or bottom surface of each of the plates or slats 12 is polished or otherwise rendered reflecting, as, for example, by nickel plating. The combination of non-reflecting and reflecting surfaces, arranged and constructed as described, and inclined downwardly with respect to a horizontal plane associated with the truncated reflector and straight filament bulb, cause the rays of light emanating from the incandescent filament to be projected for a considerable distance and diffused over a relatively wide area in front of the vehicle to accomplish adequate illumination. The arrangement is such that none of the light rays can possibly reach the eyes of the driver or occupants of an approaching vehicle, yet the rays of light are not diminished or obstructed, but are reflected so as to insure adequate illumination of the roadway in advance of the vehicle.

Referring particularly to the construction and function of the plates or slats 11 within each of the upper compartments 4 of each headlight, and with particular reference to the plates or slats 11 of the compartment 4 of the headlight at the left side of the vehicle, it is to be noted that these plates have a substantial depth, say approximately 3¼ inches, and that they extend across the entire front of the compartment in parallel spaced relation, these plates being inclined toward the right of the headlight, say at an angle of approximately 1½° to 3° from a vertical plane through the axis of the casing, as clearly shown in Fig. 6 of the accompanying drawings. Instead of inclining the plates toward the right as described, the plates may be arranged parallel to a vertical plane through the axis of the casing and the casing itself may be turned to the right at an angle of from 1½° to 3°. Or, if desired, the plates may be turned to the right at an angle of 1½° to a vertical plane through the axis of the casing and the casing itself may be turned to the right at an angle of 1½°, thus giving the plates an inclination of approximately 3°, which inclination has been found best suited to accomplish the objects of my invention. I have found that these plates or slats 11 should be spaced about 3/16 of an inch apart. The left surface of each of the plates or slats 11 is unpolished or otherwise rendered non-reflecting, whereas the right side or surface of each plate or slat 11 is polished or otherwise rendered reflecting, as, for example, by nickel plating. As stated, the straight filament of the bulb 6 in the upper compartments is disposed in a vertical position and it is thus obvious that the rays of light emanating from the vertically arranged filament, and the described arrangement of reflecting and non-reflecting surfaces on the plates or slats 11, will cause the rays of light from the upper compartment of the headlight at the left of the vehicle to be projected in front of the vehicle and toward the right side of the roadway in advance thereof. This arrangement is such that none of the rays of light are projected toward the left side of the roadway in advance of the vehicle, and hence none of the rays of light from this compartment can or will shine in the eyes of the driver or occupants of an approaching vehicle.

Referring particularly to the plate or slat arrangement in the upper compartment 4 of the headlight 2 positioned on the right side of the vehicle, the plates or slats 11 in the compartment likewise have a substantial depth, say approximately 3¼ inches, and extend across the entire front of the compartment in parallel spaced relation, being spaced about 3/16 of an inch apart. These plates are inclined toward the left of the headlight, say at an angle of approximately 1½° to 3° from a vertical plane through the axis of the casing, this inclination being accomplished either by tilting the plates to the left, or by having the plates straight within the casing and tilting the entire casing, or by having both the plates and casing tilted toward the left, to accomplish a total inclination of the plates of approximately 3°. The plates or slats 11 of this upper right compartment have their right surfaces unpolished or otherwise rendered non-reflecting, whereas the left side or surface of each plate or slat 11 of this compartment is polished or otherwise rendered reflecting, as, for example, by nickel plating. As stated, the straight filament of the bulb 6 in the upper compartment is disposed in a vertical position, and it is thus obvious that the rays of light emanating from the vertically arranged filament, and the described arrangement of reflecting and non-reflecting surfaces on the plates or slats 11, will cause the rays of light from the upper compartment of the headlight at the right of the vehicle to be projected in front of the vehicle and toward the left side of the roadway in advance thereof. It will thus be seen that the rays of light from the upper compartment of the headlight at the right side of the vehicle will shine directly into the eyes of the driver and occupants of the approaching vehicle.

In order to more clearly show the distribution of light from the respective compartments of the two headlights, particular reference is made to Figs. 1 and 2 of the accompanying drawings, wherein I have indicated by suitable legend the fan-shaped illuminated areas coming from each of the several compartments. In these figures it will be seen that the light rays emanating from the lower compartments 5 of the two headlights are marked "Lower right" and "Lower left" to designate the rays coming from the lower right and lower left compartments respectively, these rays crossing a short distance in advance of the headlight and completely illuminating the roadway in front of and to the right and left side of the vehicle. As before explained, the rays from the lower compartments 5 are, by means of the downwardly inclined plates or slats 12 with their lower reflecting and upper non-reflecting surfaces, directed downwardly so as not to strike the eyes of the driver or occupants of an approaching vehicle. These plates or slats 12, arranged as described, serve the dual purpose of reflecting the light rays from the filament downwardly, and preventing the driver of an approaching vehicle from seeing the bulb or reflector contained in the said lower compartments, although there is a slight, non-blinding light from the non-reflecting surfaces of the plates or slats 12 to show the driver of the approaching vehicle the exact position of the vehicle he is about to pass. The relatively slight downward inclination of the plates or slats 12 and the appreciable depth thereof, together with the close spacing of the plates and straight filament bulb, makes it possible to accomplish the above results without materially diminishing the light from the bulb and thus practically the entire candle power of the bulb is utilized for illuminating the roadway. The plates or slats 11 in the two upper compartments being slightly inclined toward each other, direct the rays emanating from the bulbs 6 toward each other, these rays crossing at a point or points in advance of the vehicle. In Fig. 2 of the accompanying drawings the rays of light coming from the upper right and left compartments have been designated by the legend "Upper right" and "Upper left" respectively. The plates or slats 11 in the upper compartment 4 of the left headlight 3 are slightly inclined toward the right and the right sides or surfaces of these plates are reflecting, hence these plates serve the dual purpose of shielding the bulb 6 and reflector 8 from the eyes of the driver of an approaching vehicle and reflect the light toward the right side of the roadway to insure adequate illumination of the roadway over this area. It is therefore obvious that this light may be "on" when approaching or passing another vehicle coming in the opposite direction without blinding the driver of the said approaching or passing vehicle. The plates or slats 11 in the upper compartment 4 of the right headlight 2 are slightly inclined toward the left and the left sides or surfaces of these plates are reflecting, hence the rays of light coming from the compartment will be projected toward the left side of the roadway to normally insure adequate illumination of the roadway over this area, but if this light is left "on" it is obvious that the rays will shine directly into the eyes of the driver or occupants of an approaching or passing vehicle coming in the opposite direction.

In Fig. 7 of the accompanying drawings I have shown diagrammatically a preferred type of control switch 10, and electrical connections between said switch, the vehicle battery B, and the bulbs within the several compartments 4 and 5 of the right and left headlights 2 and 3 respectively. Referring to Fig. 7 in detail it will be noted that the switch 10 includes two manually operable circuit controlling members 15 and 16, the switch member 15 comprising a switch of any desired or preferred construction, by means of which the circuit from the battery B is completed to the selective control member 16. The switch member 10 also includes two segmental contact strips 17 and 18, so associated with the pivotally mounted selective control member 16 that the said member 16 may be moved to contact with only the segmental contact 17 or with both the segmental contacts 17 and 18. Assuming that the switch 15 has been operated to close the circuit from the battery B and that the selective control member 16 is in the position shown in full lines in Fig. 7, the current will flow through said switch 15, through the member 16 to contact 17, through the connection 19 to one terminal of each of the bulbs within the lower compartments 5 of each headlight 2 and 3 and to the bulb within the upper compartment 4 of the left headlight 3. Current will also flow through the member 16, through the connection 20 to the bulb within the upper compartment 4 of the right headlight 2. Hence, all four bulbs will be illuminated, it being noted that the battery B and one terminal of each bulb is connected to ground. When it is desired to extinguish the bulb within the upper compartment 4 of the right headlight 2, for the purpose hereinbefore described, the control member 16 is moved to the right to assume a position shown in dotted lines in Fig. 7, such movement breaking the connection between said member 16 and the segmental contact 18 but maintaining the connection between said member 16 and the segmental contact 17, whereby the bulbs in both compartments 5 and in the upper compartment 4 of the left headlight 3 will remain illuminated, but the bulb in the upper compartment 4 of the right headlight 2 will be extinguished. When it is desired to extinguish all four bulbs, the switch 15 is moved to open position.

From the above description of construction and operation, it will be obvious that I have provided a headlight arrangement for motor vehicles whereby the light of all four compartments combines to insure complete and adequate illumination of the roadway, and wherein the rays of light from the several compartments are so directed and controlled that one of the lights may be extinguished to eliminate the glare which would ordinarily blind or confuse the driver of an approaching vehicle.

It is to be understood that the form of my invention herein shown and described is to be taken as the preferred embodiment of the same and that various changes in the scope, shape and arrangement of parts may be resorted to without departing from the spirit of the invention or the scope of the subjoined claims. Instead of one surface of the plates or reflectors being reflecting and the other side dull or non-reflecting, the non-reflecting side may be coated with a colored non-reflecting paint, for example, red or green, to designate the right and left sides of the vehicle. Instead of arranging the plates or slats 11 and 12 at an angle within the casing as shown in the drawings, the plates may be arranged straight within the casings and the casings tilted up or down or to the right or left to accomplish the results specified. Or the plates may be inclined as specified and the casings also tilted downwardly or to the right or left to thus vary the angle of projection and to accomplish the objects specified.

Having thus described my invention, I claim:

1. A pair of headlights adapted for mounting at the right and left of the front portion of a motor vehicle, each headlight comprising a separate upper and lower compartment having separate bulbs therein, a series of plates mounted in the front of each lower compartment and adapted to direct the rays of light downwardly to illuminate the roadway in advance of the vehicle, a series of plates mounted in front of the upper compartment of the left headlight and adapted to direct the rays of said compartment toward the forward right side of the roadway, a series of plates mounted in front of the upper compartment of the right headlight and adapted to direct the rays of said compartment toward the forward left side of the roadway, and means to extinguish the bulb in the upper compartment of the right headlight to eliminate the objectionable glare from said compartment which would normally shine into the eyes of the driver of an approaching or passing vehicle.

2. A pair of headlights adapted for mounting at the right and left of the front portion of a motor vehicle, each headlight comprising a separate upper and lower compartment having a separate bulb and reflector therein, a series of horizontal plates extending across the front of each lower compartment and inclined downwardly to direct the light rays downwardly to illuminate the roadway in advance of the vehicle, a series of vertical plates extending across the front of the upper compartment of the left headlight and tilted about a vertical axis to direct the rays of said compartment toward the forward right side of the roadway, a series of vertical plates extending across the front of the upper compartment of the right headlight and tilted about a vertical axis to direct the rays of said upper compartment toward the forward left side of the roadway, and means to extinguish the bulb in the upper compartment of the right headlight to eliminate the objectionable glare from said compartment which would normally shine into the eyes of the driver of an approaching or passing vehicle.

3. A pair of headlights adapted for mounting at the right and left of the front portion of a motor vehicle, each headlight comprising a separate upper and lower compartment having a separate bulb and reflector therein, a series of horizontal plates extending across the front of each lower compartment and having their upper surfaces non-reflecting and their lower surfaces reflecting to direct the light rays downwardly to illuminate the roadway in advance of the vehicle, a series of vertical plates extending across the front of the upper compartment of the left headlight and having their left surfaces non-reflecting and their right surfaces reflecting to direct the light rays toward the forward right side of the roadway, a series of vertical plates extending across the front of the upper compartment of the right headlight and having their right surfaces non-reflecting and their left surfaces reflecting to direct the light rays toward the forward left side of the roadway, and means to extinguish the bulb in the upper compartment of the right headlight to eliminate the objectionable glare from said compartment which would ordinarily shine into the eyes of the driver of an approaching or passing vehicle.

4. A pair of headlights adapted for mounting at the right and left of the front portion of a motor vehicle, each headlight comprising a separate upper and lower compartment having a separate bulb and reflector therein, a series of horizontal plates arranged in parallel spaced relation across the front of each lower compartment and having their upper surfaces non-reflecting and their lower surfaces reflecting, said plates being inclined downwardly to direct the light rays downwardly to illuminate the roadway in advance of the vehicle, a series of vertical plates arranged in parallel spaced relation across the front of the upper compartment of the left headlight and having their left surfaces non-reflecting and their right surfaces reflecting, said plates being tilted about a vertical axis to direct the rays of said compartment toward the forward right side of the roadway, a series of vertical plates arranged in parallel spaced relation across the front of the upper compartment of the right headlight and having their right surfaces non-reflecting and their left surfaces reflecting, said plates being tilted about a vertical axis to direct the rays of said compartment toward the forward left side of the roadway, and means to extinguish the bulb in the upper compartment of the right headlight to eliminate the objectionable glare from said compartment which would normally shine into the eyes of the driver of an approaching or passing vehicle.

5. A pair of headlights adapted for mounting at the right and left of the front portion of a motor vehicle, each headlight comprising a separate upper and lower compartment having separate bulbs therein, the bulbs having straight filaments, said filaments being arranged in vertical position within the upper compartments and arranged in horizontal position within the lower compartments, a series of horizontal plates extending across the front of each lower compartment and inclined to direct the rays of light downwardly, a series of vertical plates extending across the front of the upper compartment of the left headlight and tilted about a vertical axis to direct the rays of said compartment toward the forward right side of the roadway, a series of vertical plates extending across the front of the upper compartment of the right headlight and tilted about a vertical axis to direct the rays of said upper compartment toward the forward left side of the roadway, and means to extinguish the bulb in the upper compartment of the right headlight to eliminate the objectionable glare from said compartment which would normally shine into the eyes of the driver of an approaching or passing vehicle.

In testimony whereof I hereunto affix my signature.

WILLIAM F. KELLER.